United States Patent
Chang et al.

(10) Patent No.: US 11,671,561 B1
(45) Date of Patent: Jun. 6, 2023

(54) VIDEO CONFERENCE BACKGROUND CLEANUP USING REFERENCE IMAGE

(71) Applicant: Zoom Video Communications, Inc., San Jose, CA (US)

(72) Inventors: Shihwei Chang, Sammamish, WA (US); Robert Aaron Klegon, Chicago, IL (US); Cynthia Eshiuan Lee, Austin, TX (US); Nicholas Mueller, Fitchburg, WI (US); Shane Paul Springer, Manchester, MI (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/877,789

(22) Filed: Jul. 29, 2022

(51) Int. Cl.
*H04N 7/14* (2006.01)
*G06T 7/194* (2017.01)
*G06V 40/16* (2022.01)

(52) U.S. Cl.
CPC .............. *H04N 7/147* (2013.01); *G06T 7/194* (2017.01); *G06V 40/161* (2022.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 7,227,567 B1 * | 6/2007 | Beck | ...................... | H04N 7/147 348/14.07 |
| 7,564,476 B1 * | 7/2009 | Coughlan | .............. | H04N 7/147 348/14.08 |
| 2008/0030621 A1 * | 2/2008 | Ciudad | .................. | H04N 7/147 348/E5.058 |
| 2008/0077953 A1 * | 3/2008 | Fernandez | ............... | H04N 7/18 725/32 |

(Continued)

OTHER PUBLICATIONS

Real or Virtual: A Video Conferencing Background Manipulation-Detection System, Ehsan Nowroozi, Yassine Mekdad, Mauro Conti, Simone Milani, A. Selcuk Uluagac, Berrin Yanikoglu, Apr. 27, 2022, 34 pages.

(Continued)

*Primary Examiner* — Hemant S Patel
(74) *Attorney, Agent, or Firm* — Young Basile Hanlon & MacFarlane, P.C.

(57) ABSTRACT

A computer stores a reference image representing a physical background within a field of view of a camera of a client device. The computer receives, via the camera and during a video conference to which the client device is connected, camera-generated visual data for output to at least one remote device connected to the video conference. The computer identifies, based on facial recognition applied to the camera-generated visual data, foreground imagery representing at least one person and background imagery representing content of the camera-generated visual data other than the foreground imagery. The computer identifies a difference between the background imagery and the refer- (Continued)

ence image. The computer generates a composite image by replacing, within the background imagery of the camera-generated visual data, an item represented within the background imagery and within the identified difference with a co-located part of the reference image.

20 Claims, 9 Drawing Sheets

(56) References Cited

U.S. PATENT DOCUMENTS

| | | | |
|---|---|---|---|
| 2012/0050323 A1* | 3/2012 | Baron, Jr. | G09G 5/14 345/632 |
| 2017/0142371 A1* | 5/2017 | Barzuza | H04L 65/403 |
| 2018/0114009 A1* | 4/2018 | Maresh | H04L 63/08 |

OTHER PUBLICATIONS

Background Buster: Peeking through Virtual Backgrounds in Online Video Calls, Mohd Sabra, Anindya Maiti, Murtuza Jadliwala, Jun. 27-30, 2022, 42 pages.
Pro IT Insights for Business, This Microsoft Teams update could bring the worst thing about high school to your work calls, Mike Moore, Jul. 11, 2022, 9 pages.

* cited by examiner

VIDEO CONFERENCE BACKGROUND CLEANUP USING REFERENCE IMAGE

FIELD

This disclosure relates to video conferencing, which may be performed using software services implemented over a network. Some implementations relate to background cleanup for video conferencing.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
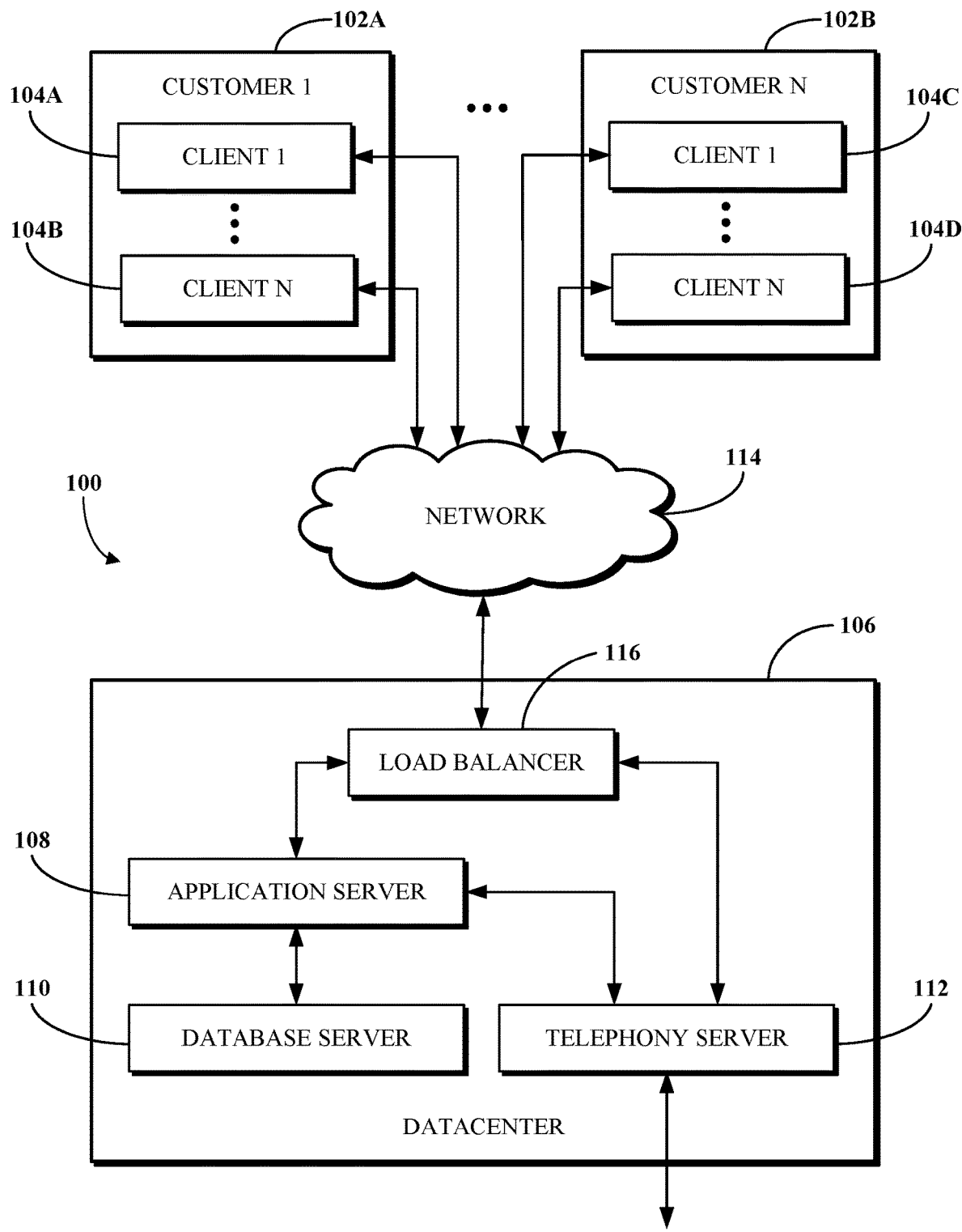
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

During a video conference, a participant may share a video feed from the client device which they use to connect to the video conference. The video feed may include only raw visual data generated by a camera of the client device. Alternatively, the video feed may be modified by the use of a virtual background. For example, the client device used by a video conference participant may leverage facial recognition technology to identify the participant's face and replace the participant's surroundings (e.g., a physical background behind the participant) with a virtual background (or blur the participant's surroundings but not the participant's face and body). A participant whose physical background is appropriate to the video conference or who otherwise prefers to show the physical background to other participants may choose to share the raw visual data. In such a case, the physical background will be visible to other conference participants with the subject participant's video feed. Alternatively, a participant who wishes to keep their physical background private or who otherwise prefers to not show the physical background to other participants may choose to use a virtual background (or to blur their background).

Conventional conferencing software systems thus enable a conference participant to selectively use a virtual background. However, such selective use merely causes an entire background of the participant to be replaced. While conventional conferencing software systems fail to enable background cleanup approaches for selectively altering a portion of a background view in a video conference without using a full virtual background, such an approach may be highly desirable. For example, in some cases, a participant may wish to share their physical background within their video feed, but may have some items in the physical background (e.g., a garbage can, a moving box, or a private item) that they would like to conceal from visibility. Alternatively, a participant with a bland background (e.g., a wholly white wall) may wish to present their physical background while visually enhancing it, for example, with digitally-added art or a window scene.

Implementations of this disclosure accordingly implement systems and techniques for video conferencing background cleanup. The implementations of this disclosure address a computing device (which may be a client device or a server communicating with the client device) storing a reference image representing a physical background within a field of view of a camera of the client device. The reference image may be taken, for example, when a physical space (e.g., a conference room or home office) is empty or is otherwise clean and free of clutter. During a video conference, the client device or the server receives camera-generated visual data for transmission to a remote device (or multiple remote devices) participating in the video conference. Prior to the transmission, the computing device identifies foreground imagery, which includes at least one person, and background imagery in the camera-generated visual data. The background imagery may include the camera-generated visual data that does not include a person (or is not identified as including a person). The computing device identifies, within the background imagery, an extraneous item (e.g., a new wall painting or a portable item) that is not present in the reference image. The computing device generates modified visual data by replacing, within the camera-generated visual data, the extraneous item with a corresponding part of the reference image. The modified visual data is transmitted to remote devices participating in the video conference. As a result, a user of video conferencing software is able to show their real background while omitting certain items (e.g., inappropriate posters, clutter on the floor or on shelves) in the background that they do not wish to show to other video conference participants.

In some implementations, a reference image might not be stored. In these implementations, the computing device captures the camera-generated visual data and identifies the imagery of the at least one person and the background imagery. The computing device identifies, within the background imagery, an extraneous item for removal. The extraneous item may be identified manually by a user. For example, the user might draw a border around an item using a mouse, finger, or stylus and select an icon for removing the item. Alternatively, the extraneous item may be identified automatically using extraneous item identification software. The extraneous item identification software may be trained based on items that the user and other users removed from the background imagery. For example, if other users removed moving boxes and a moving box is detected in the background imagery, the moving box may be removed. In some cases, the user may be notified (during or after the video conference) that the moving box was removed, and may be asked to approve or disapprove of the removal of the moving box from the background in future video conferences. The computing device generates modified visual data by removing the extraneous item and predicting, using replacement imagery prediction software, replacement imagery to replace the removed extraneous item. In some cases, the background may also be virtually enhanced during generation of the modified visual data. For example, if a user is sitting in a bland background with no windows, a virtual window (and outside scene) may be added to a part of the background in response to a user input requesting background enhancement. The modified visual data is transmitted to remote devices participating in the video conference.

To describe some implementations in greater detail, reference is first made to examples of hardware and software structures used to implement background cleanup. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
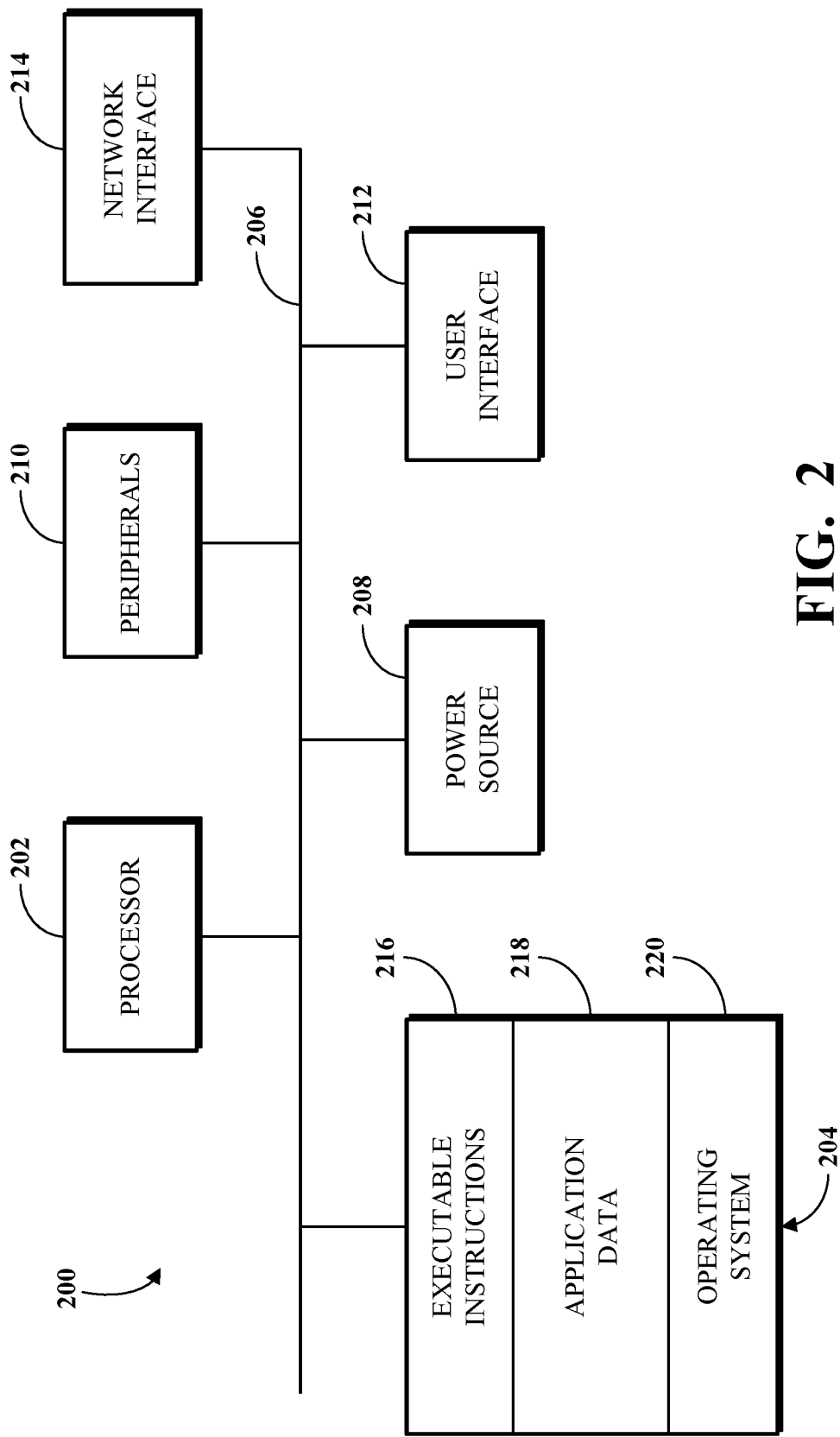
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
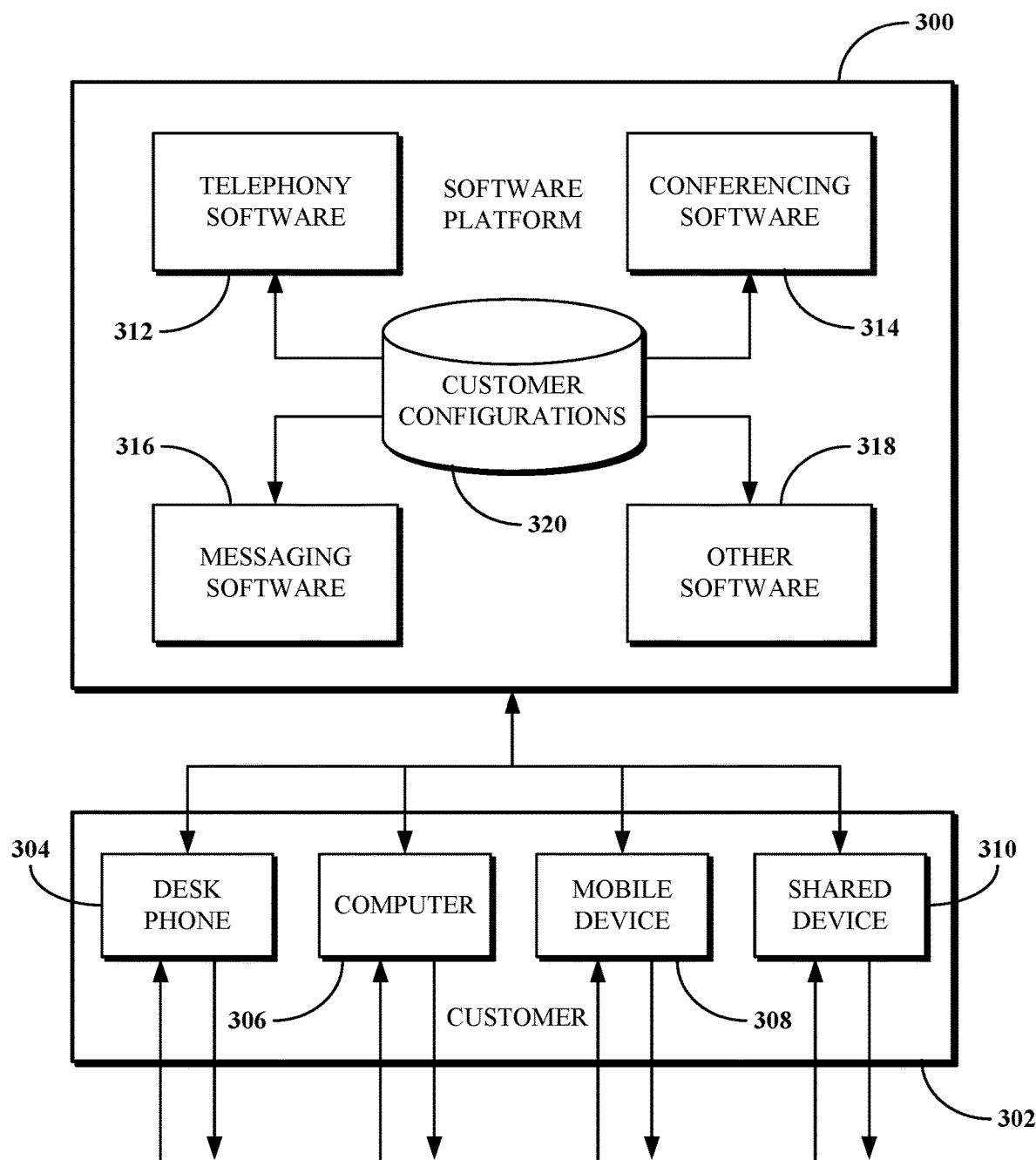
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single physical space, for example, a conference room, in which the conferencing software 314 may facilitate a conference between only those participants and using one or more clients within the physical space. In some cases, one or more participants may be physically present within a single location and one or more other participants may be remote, in which the conferencing software 314 may facilitate a conference between all of those participants using one or more clients within the physical space and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include video conferencing background cleanup and/or enhancement software. In some such cases, the other software 318 may be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
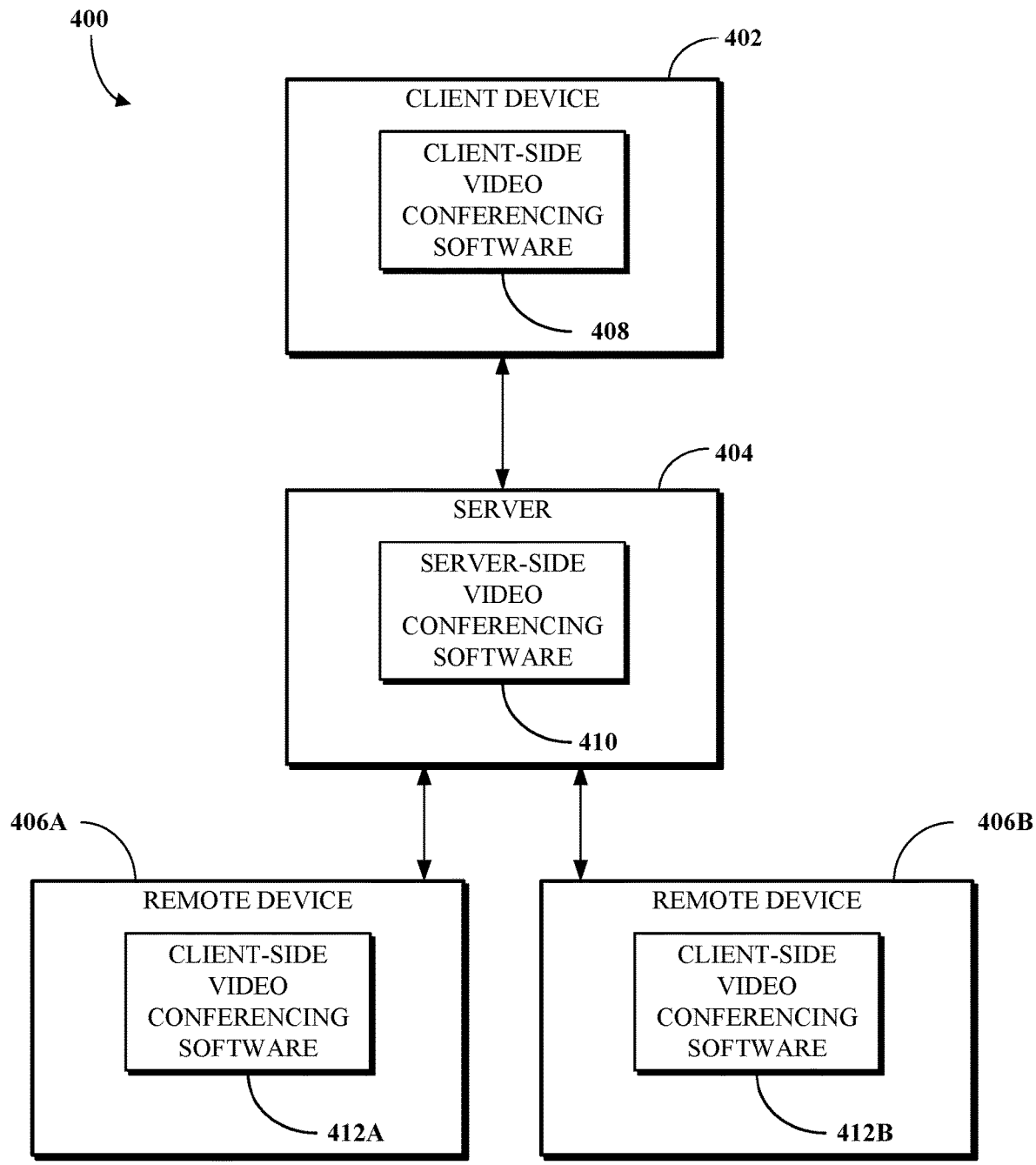
FIG. 4 is a block diagram of an example of a video conferencing system.

FIG. 4 is a block diagram of an example of a video conferencing system 400. As shown, the video conferencing system 400 includes a client device 402, a server 404, and remote devices 406A, 406B. Each of the remote devices 406A, 406B may be located remotely from the client device 402 and may communicate with the client device 402 over a network via the server 404. The client device 402 and/or the remote devices 406A, 406B may correspond to one or more of the clients 104A-D. The server 404 may correspond to the application server 108.

As shown, the client device 402 includes client-side video conferencing software 408. The client-side video conferencing software 404, when executed, causes the client device 402 to generate audio, video, and/or screensharing data for transmission to the server 404 during the video conference, and/or to receive audio, video, and/or screensharing data, via the server 404, from the other devices (e.g., the remote devices 406A, 406B) connected to the video conference. The client-side video conferencing software 408 may be an application stored in the memory of the client device 402. The client-side video conferencing software 408 may also include software for cleaning up and/or enhancing the background of received image or video data, as disclosed herein.

The server 404 includes server-side video conferencing software 410. The server-side video conferencing software 410, when executed, causes the server 404 to receive, from the client device 402 and/or the remote devices 406A, 406B, requests to connect to the video conference, to connect the client device 402 and/or the remote devices 406A, 406B to the video conference responsive to the requests, to receive audio, video, and/or screensharing data from one of the devices (e.g., the client device 402 and/or the remote devices 406A, 406B) connected to the conference, and to transmit the received audio, video, and/or screensharing data to other devices connected to the conference. The server-side video conferencing software 410 may also include software for cleaning up and/or enhancing the background of received images or video data, as disclosed herein.

The remote device 406A includes client-side video conferencing software 412A, which functions similarly to the client-side video conferencing software 408. The remote device 406B includes client-side video conferencing software 412B, which functions similarly to the client-side video conferencing software 408.

Implementing a video conference includes transmitting and receiving video, audio, and/or other data between devices connected to the video conference, including, for example, the client device 402 and/or the remote devices 406A, 406B. Each of the client device 402 and/or the remote devices 406A, 406B may connect through the server 404 using separate input streams to enable users thereof to participate in the video conference together using the client-side video conferencing software 408, 412A, 412B and the server-side video conferencing software 410.

The server-side video conferencing software 410 includes a user interface tile for each input stream received and processed at the server 404. A user interface tile as used herein generally refers to a portion of a conferencing software user interface which displays information (e.g., a rendered video) associated with one or more devices (e.g., the client device 402 and/or the remote devices 406A, 406B) connected to the video conference. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface.

The content of the user interface tile associated with a given device may be dependent upon the source of the input stream for that device. For example, where a participant accesses the video conference from a device such as a smartphone or a laptop or desktop computer, the user interface tile associated with that participant may include a video stream captured at the device and transmitted to the server 404, which is then transmitted from the server 404 to other devices for viewing by other participants (although the participant may optionally disable video features to suspend the video stream from being presented during some or all of the conference).

The server-side video conferencing software 410 may include a thread encoding tool 402 that receives video streams separately from the client device 402 and/or the remote devices 406A, 406B and encodes those video streams using one or more transcoding tools, such as to produce variant streams at different resolutions. For example, a given video stream received from the client device 402 may be processed using multi-stream capabilities of the server-side video conferencing software 410 to result in multiple resolution versions of that video stream, including versions at 90p, 180p, 360p, 720p, and/or 1080p, amongst others. The video streams may be received from the client device 402 over a network, for example, the network 114 shown in FIG. 1, or by a direct wired connection, such as using a universal serial bus (USB) connection or like coupling aspect. After the video streams are encoded, a switching/routing tool directs the encoded streams through applicable network infrastructure and/or other hardware to deliver the encoded streams to the server-side video conferencing software 404. The server-side video conferencing software 404 transmits the encoded video streams to the remote devices 406A, 406B, which receive and decode the encoded video streams to output the video content thereof for display by video output components.

In some implementations, other software services may be accessible in connection with a conference implemented using the video conferencing system 400. For example, a video conference may include or otherwise integrate functionality for instant messaging, unified messaging, and other types of messaging communications between participants of the conference, such as to facilitate a chat or like virtual conversation between users of those participants. Those other software services may be implemented at the video conferencing system 400 and/or a different aspect of the system 100.

Figure 5:
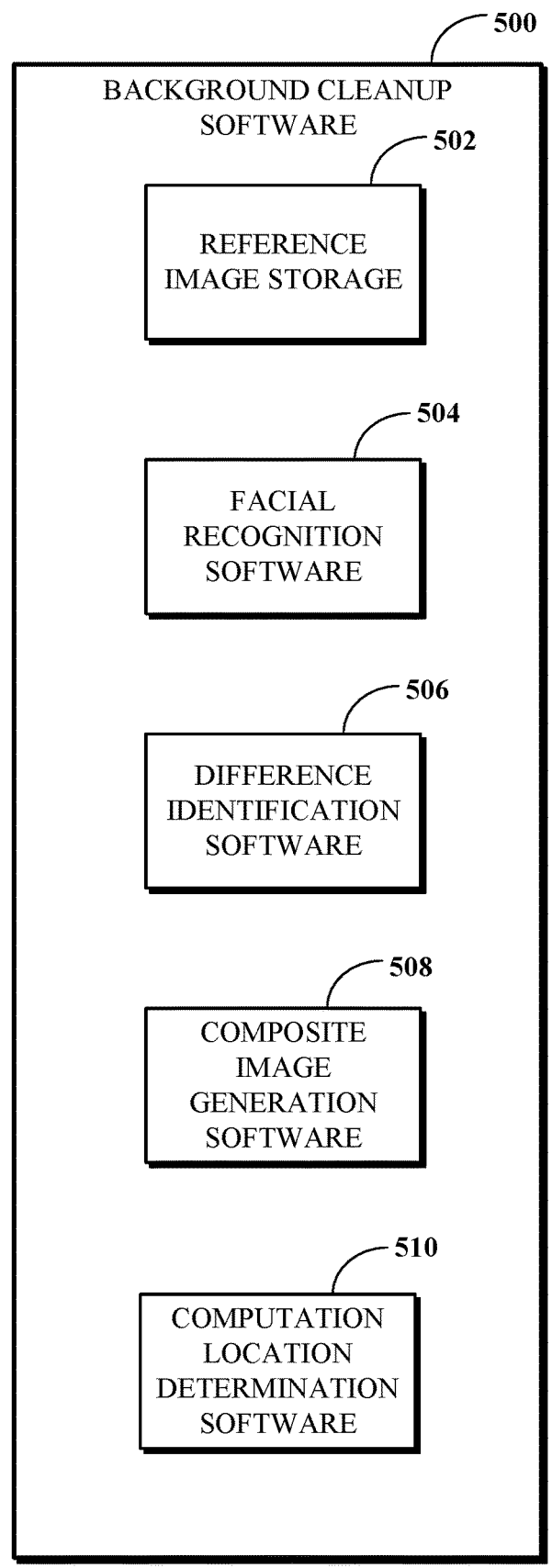
FIG. 5 is a block diagram of an example of background cleanup software that uses a reference image.

FIG. 5 is a block diagram of an example of background cleanup software 500 that uses a reference image. The background cleanup software 500 is software usable with a video conference (e.g., implemented using the video conferencing system 400) for selectively altering a portion of a background view in a video conference without using a full virtual background. The background cleanup software 500 may reside at a computing device, such as the client device 402 or the server 404. In some cases, a first part of the background cleanup software 500 may reside at the client device 402 and a second part of the background cleanup software 500 may reside at the server 404. In some implementations, all or a part of the background cleanup software 500 is a component of the client-side video conferencing software 408 and/or the server-side video conferencing software 410.

As shown, the background cleanup software 500 includes a reference image storage 502, which stores a reference image. The reference image represents a physical background within a field of view of a camera of the client device 402. The reference image may be captured at the client device 402 by a user of the client device 402 when configuring the client-side video conferencing software 408. For example, the user may be prompted to verify that they are in a physical space from which they plan to attend video conferences (e.g., a conference room, a home office, a business office, or a café or shared space where the user frequently works) and that the physical space is in a user-approved state free of clutter, dirt, and other people. In response and with affirmative consent from the user (e.g., obtained by selecting an icon on a graphical user interface (GUI)) the camera of the client device 402 may be turned on and an image may be obtained. The user may be asked to rotate the camera in various directions so that a wide view (wider than a typical view from the camera lens) of the physical space may be obtained. This allows the reference image to be useful if the camera is in a slightly different position during the video conference and during the obtaining of the reference image.

The reference image storage 502 may reside at the client device 402 and/or at the server 404 in association with a video conferencing account of the user of the client device 402. As shown, a single reference image may be stored in the reference image storage 502. In alternative implementations, multiple reference images may be stored in the reference image storage 502 (e.g., in association with a single video conferencing account) and an appropriate reference image for the client device 402 may be selected based on the geographic location of the client device 402. In some implementations, a business owner (e.g., an owner of a café or a co-working space) may generate a reference image and make that reference image publicly available (e.g., to all users or to users having an email address associated with a specific domain, e.g., *@example.com) to encourage users to conduct video conferences in the café or the co-working space.

In one example use case, Hannah regularly attends video conferences from her home office, her business office, her neighborhood café, and a hotel lobby in a city to which she frequently travels. Hannah generates four reference images (for each of the home office, the business office, the neighborhood café, and the hotel lobby) and stores those in association with her video conferencing account. When Hannah joins a video conference and requests background cleanup, Hannah's client device determines its geographic location (e.g., using global positioning system technology or cellular triangulation technology). If the determined geographic location corresponds to the home office, the business office, the neighborhood café or the hotel lobby, the client device accesses (e.g., by downloading or accessing via remote storage) the associated reference image and implements background cleanup using the corresponding reference image as disclosed herein. For example, if the determined geographic location is the neighborhood café, the stored reference image associated with the neighborhood café is used.

At a different time, when the client device 402 is connected to a video conference, the background cleanup software 500 receives camera-generated visual data from the camera of the client device 402 for transmission to the remote devices 406A, 406B connected to the conference. The background cleanup software 500 uses facial recognition software 504 to identify, within the camera-generated visual data, foreground imagery representing at least one person and background imagery representing content of the camera-generated visual data other than the foreground imagery. The facial recognition software 504 may be implemented using a convolutional neural network (CNN) which is trained using a labeled dataset of human faces, such as MegaFace® or LFW® (Labeled Faces in the Wild®). Alternatively, other types of artificial neural networks (or other artificial intelligence or machine learning technologies) or other machine learning models may be used to implement the facial recognition software 504.

The background cleanup software 500 uses difference identification software 506 to identify a difference between the background imagery and the reference image stored in the reference image storage 502. In some examples, the background cleanup software 500 maps each block of pixels (e.g., an 8×8, 16×16, 32×32, 64×64, or 128×128 block of pixels) in the background imagery to a corresponding block of pixels in the reference image and determines whether the block of pixels from the background imagery corresponds to the same item(s) that are depicted in the block of pixels from the reference mage 502 or different item(s). The blocks of pixels may have different sizes based on the contents thereof. In some cases, the pixels may be directly compared to one another. Alternatively, to account for situations with variable lighting, item recognition technology (e.g., implemented using a CNN or other artificial intelligence technology) may be used to determine whether the items (e.g., tables, chairs, lamps, fans, boxes, or garbage cans) in the block of pixels from the background imagery and the block of pixels from the reference image are the same or different. In other examples, items are recognized in both the background imagery and the reference image, and the difference is determined based on items present in the background imagery and absent in the reference image, and/or vice versa.

According to some examples, when the reference image is captured, item recognition is applied to the reference image and items depicted in the reference image are tagged. During the video conference, item recognition is applied to the items in the background imagery to determine whether they are the same as or different from the items in the reference image. If an item appears in the reference image and does not appear in the background imagery (e.g., a poster that was hanging on the wall when the reference image was captured, but was subsequently removed), that item is overlayed onto the background imagery in its position within the reference image. If an item appears in the background imagery and does not appear in the reference image, that item is removed from the background imagery and overlayed with the co-located part of the reference image.

The background cleanup software 500 uses composite image generation software 508 to generate a composite image by replacing, within the background imagery of the camera-generated visual data, an item represented within the background imagery and within the identified difference with a co-located part of the reference image. The composite image also includes the foreground imagery of the camera-generated visual data. After the composite image generation software 508 generates the composite image, the composite image is transmitted to the remote devices 406A, 406B connected to the video conference for display thereat.

As shown, the background cleanup software 500 includes computation location determination software 510 which determines whether components of the background cleanup software 500 (e.g., at least one of the facial recognition software 504, the difference identification software 506, and the composite image generation software 508) are to execute at the client device 402 or at the server 404. In some examples, this determination is made based on capabilities of the client device 402 and/or capabilities of the server 404. The capabilities of the client device 402 and/or the capabilities of the server 404 may include at least one of processing capabilities, memory capabilities, network access capabilities, software capabilities, and hardware capabilities. For example, the client device 402 may be a "thin" client that lacks processing capabilities to run facial recognition and/or item recognition. In this case, some components of the background cleanup software 500 may execute at the server 404. In other cases, the client device 402 may be a modern high-end computer with an advanced graphics processing unit (GPU) and an advanced central processing unit (CPU) connected to a high-speed network. In these cases, some components of the background cleanup software 500 may execute at the client device 402.

Figure 6:
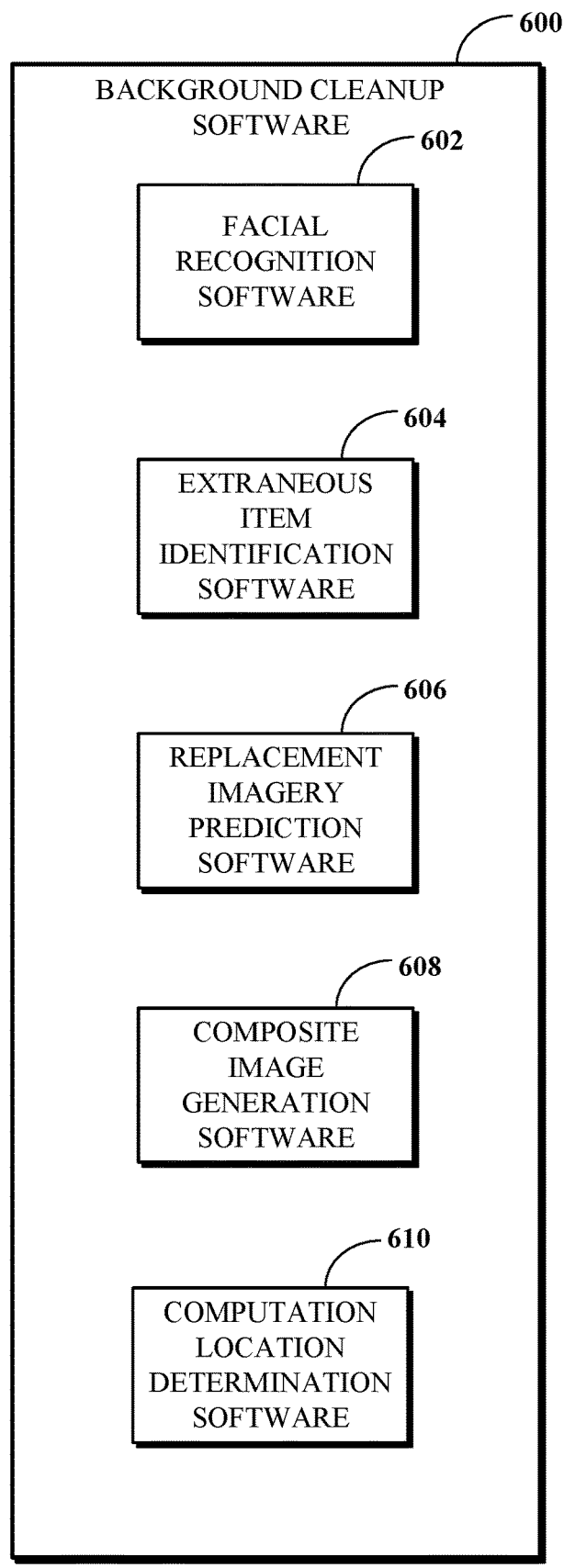
FIG. 6 is a block diagram of an example of background cleanup software that predicts replacement imagery.

FIG. 6 is a block diagram of an example of background cleanup software 600 that predicts replacement imagery. Unlike the background cleanup software 500, the background cleanup software 600 might not rely on a stored reference image, and may instead leverage artificial intelligence techniques to predict parts of the background imagery from which an item is to be removed. Similar to the background cleanup software 500, the background cleanup software 600 may reside at a computing device, such as the client device 402 or the server 404. In some cases, a first part of the background cleanup software 600 may reside at the client device 402 and a second part of the background cleanup software 600 may reside at the server 404. In some implementations, all or a part of the background cleanup software 600 is a component of the client-side video conferencing software 408 and/or the server-side video conferencing software 410.

The background cleanup software 600 receives, during a video conference to which the client device 402 is connected, camera-generated visual data for eventual output to the remote devices 406A, 406B connected to the video conference. The background cleanup software 600 leverages the facial recognition software 602 to identify the foreground imagery representing at least one person and the background imagery representing content of the camera-generated visual data other than the foreground imagery. The facial recognition software 602 may have a similar structure and function to the facial recognition software 504 of FIG. 5.

The background cleanup software 600 uses extraneous item identification software 604 to identify, within the background imagery, an extraneous item for removal. The extraneous item includes a portion of the background imagery. In some examples, the extraneous item identification software 604 identifies the extraneous item (or multiple extraneous items) by prompting the user to manually draw a border around the extraneous item (or the multiple extraneous items) that are to be removed. In some cases, the user may navigate, via a menu, to an interface for removing extraneous items from the background and then be prompted to draw the border (e.g., using a mouse on a non-touchscreen display or using a finger or a stylus on a touchscreen display). Alternatively (or in addition) to the above, the extraneous item may be identified automatically. The extraneous item identification software 604 may leverage a CNN or other artificial intelligence techniques (e.g., reinforcement learning or semi-supervised learning) to identify extraneous items for removal. For example, if users of the background cleanup software 600 typically remove moving boxes from their background and a moving box is detected in the background imagery being processed, the extraneous item identification software 604 may flag the detected moving box for removal. In some cases, the user is immediately prompted to approve or deny the removal of the automatically-detected extraneous item (e.g., the detected moving box). In other cases, so as not to disturb the user during the video conference, the automatically-detected extraneous item may be removed without immediately notifying the user. The user may later be notified (e.g., via email or instant message) of the automatically-detected extraneous items and asked to confirm whether the removal was appropriate or inappropriate. The user's confirmation may be used to further train the artificial intelligence of the extraneous item identification software 604.

The artificial intelligence of the extraneous item identification software 604 may be trained based on extraneous items removed by other users (in the same location as the client device 402 or in different locations), based on extraneous items previously removed by the user of the client device 402, and based on confirmations provided by the user of the client device 402 and other users. For example, if other users typically remove garbage cans from their background, but the user of the client device 402 typically does not remove garbage cans, a garbage can might not be removed from the background.

After the extraneous item is removed, the background cleanup software 600 uses replacement imagery prediction software 606 to predict replacement imagery to replace the removed extraneous item. The replacement imagery prediction software 606 may include a CNN or other artificial intelligence software. Alternatively or in addition, the replacement imagery prediction software 606 may include a rule-based technique that extends a pattern. For example, if the removed extraneous item is a person sitting on a chair (e.g., in a coffee house), artificial intelligence technology may be used to predict how the chair would appear without the person sitting thereon. If the removed extraneous item is a pile of papers on a floor with a tile pattern, the rule-based technique may be used to expand the tile pattern over the pixels previously occupied by the pile of papers.

The background cleanup software 600 includes composite image generation software 608 that generates a composite image. The composite image includes the foreground imagery of the camera-generated visual data and the background imagery with the extraneous item replaced by the predicted replacement imagery, as described above. The composite image is transmitted to the remote devices 406A, 406B connected to the video conference for display thereat. In some cases, during the transmission of the composite image, the composite image is processed at the server 404 prior to delivery to and rendering at the remote devices 406A, 406B.

As shown, the background cleanup software 600 includes computation location determination software 610 which determines whether components of the background cleanup software 600 (e.g., at least one of the facial recognition software 602, the extraneous item identification software 604, the replacement imagery prediction software 606, and the composite image generation software 608) are to execute at the client device 402 or at the server 404. The computation location determination software 610 may have a structure and function similar to that of the computation location determination software 510 of FIG. 5.

FIGS. 7A-D illustrate example images 700A, 700B, 700C, 700D that may be processed by video conferencing software (e.g., the client-side video conferencing software 408 and/or the server-side video conferencing software 410).

Figure 7A:
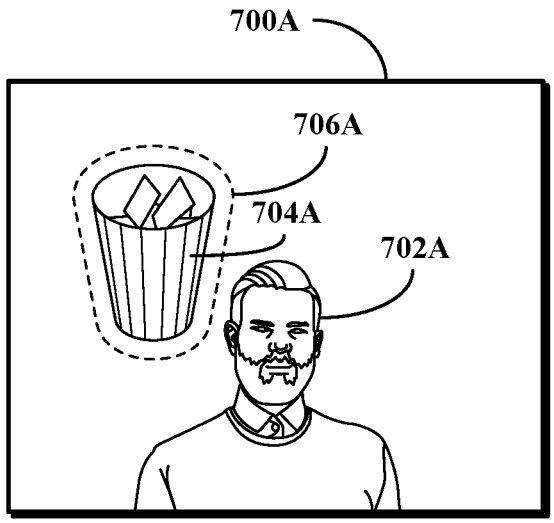
FIGS. 7A-D illustrate example images that may be processed by video conferencing software.

In FIG. 7A, the image 700A may be captured by a camera of the client device 402. As shown, the image 700A depicts a person 702A and a garbage can 704A. The person 702A is the foreground imagery of the image 700A and the remainder of the image 700A is the background imagery. As shown, the user of the client device 402A draws a border 706A around the garbage can 704A in order to indicate that the garbage can is to be removed. In some cases, the user may navigate to a menu item for cleaning up the background imagery and, upon selecting the menu item, be prompted to draw the border 706A to cause the interior of the border to be removed.

The border may be drawn in different ways. In some cases, a user clicks and drags with a mouse (or draws with a finger or a stylus on a touchscreen) around a region that includes item(s) to be removed. For example, the user may click and drag with the mouse or move a finger or a stylus along the border 706A. In some cases, a user may highlight the region that includes items to be removed using a tool and/or be provided (e.g., through a menu) with a virtual eraser for virtually erasing parts of their background. In some cases, the user may click on (or otherwise select) an item (e.g., the garbage can 704A) and a bounding box may automatically appear around the item, marking it for removal from the background imagery.

In alternative implementations, the user might not draw the border 706A to cause the garbage can 704A to be removed. For example, a reference image of the background imagery without the garbage can may be stored, and the computing device (e.g., the client device 402 or the server 404) may determine that the garbage can 704fA is present in the image 700A but not the reference image and, therefore, should be removed. In another example, a reference image might not be available, and the computing device may determine, using artificial intelligence techniques and based on item(s) that were manually removed in the past, that the garbage can 704A is an extraneous item that should be removed from the image 700A.

Figure 7B:
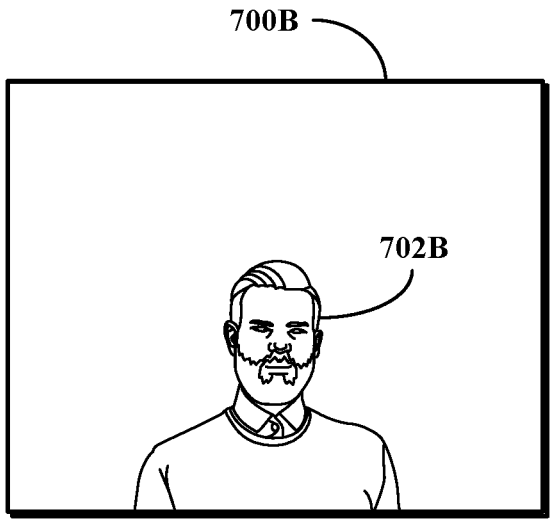

FIG. 7B illustrates the image 700B that results from the garbage can 704A being removed. As shown, the person 702B (corresponding to the person 702A) is still depicted, but the garbage can 704A is no longer depicted. Replacement imagery (identical to the rest of the background) replaces the garbage can 704A. The replacement imagery may correspond to the co-located part of the reference image. Alternatively, if no reference image is available, the replacement imagery may be computed automatically, for example, using rule-based software or artificial intelligence software. In some examples, if no reference image is available and the rule-based software or the artificial intelligence software is unable to generate a replacement image, a default replacement image (e.g., a white space) may be used or the user may be prompted to select an image file for use as the replacement image.

Figure 7C:
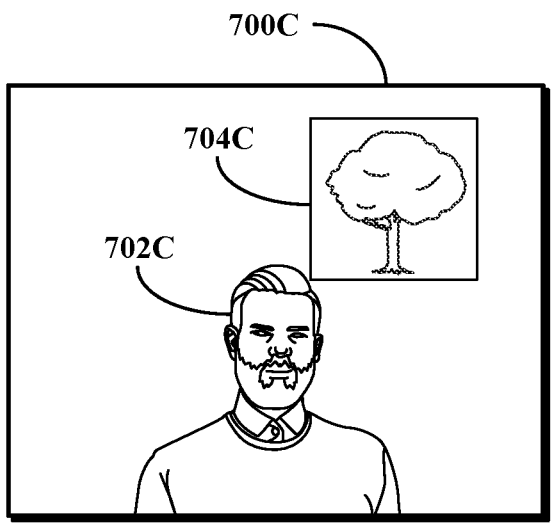

FIG. 7C illustrates the image 700C that results from a user adding an enhancement to the image 700B. As shown, the image 700C illustrates the person 702C and a virtual sticker 704C. The virtual sticker 704C may be added through a menu available in the client-side video conferencing software. The virtual sticker 704C may be a still image, a moving image (e.g., a graphics interchange format (GIF) image), or a video that is displayed within a part of the background imagery. The virtual sticker 704C may be generated by a user of the client device 402 or may be selected from a preset collection of virtual stickers available through the client-side video conferencing software 408. The virtual sticker 704C may be useful to make a bland background (e.g., a white wall) more interesting for participants in the video conference. In some cases, the user may select the position of the virtual sticker by dragging the virtual sticker 704C across the display using a mouse, a finger, or a stylus. In some cases, the user may resize the virtual sticker 704C by dragging an edge or a corner of the virtual sticker. Furthermore, it should be noted that, while the shape of the virtual sticker 704C is illustrated to be rectangular, the virtual sticker 704C may have other shapes (e.g., a circle, a triangle, or an arbitrary shape).

As described above, the user of the client device 402 selects their own virtual sticker 704C. In alternative implementations, a virtual sticker may be added by an administrator associated with the account of the user of the client device. For example, a university administrator may create a setting that all business school students display a virtual sticker including a logo of the business school in the top left corner of images transmitted in the video conference while all law school students display a virtual sticker including a logo of the law school in the top right corner of images transmitted in the video conference. In some implementations, an administrator of a corporation may create a setting ensuring that all employees of the corporation (having accounts associated with email addresses in the corporation's domain) display a banner including the name and the logo of the corporation at the top of their images transmitted in video conferences.

Figure 7D:
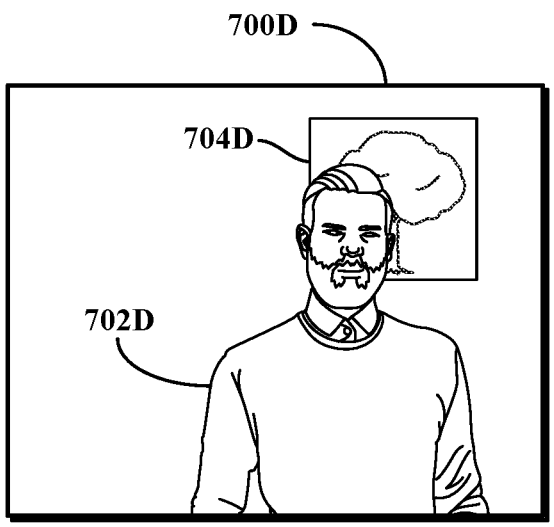

FIG. 7D illustrates the image 700D where the person 702D moves in front of a part of the virtual sticker 704D. As shown, as a result of the person 702D moving in front of the virtual sticker 704D, a first part of the virtual sticker 704D is obscured by the person 702D. A second part of the virtual sticker 704D is still visible as the second part is not obscured by the person 702D. The virtual sticker 704D may appear in front of background items (e.g., a wall, a floor, or a bookcase) in the camera-generated visual data and behind the foreground imagery including the person 702D. The same applies to the part of the reference image or the predicted replacement imagery obscuring the garbage can 704A (shown in FIG. 7A) in the image 700B.

Figure 8:
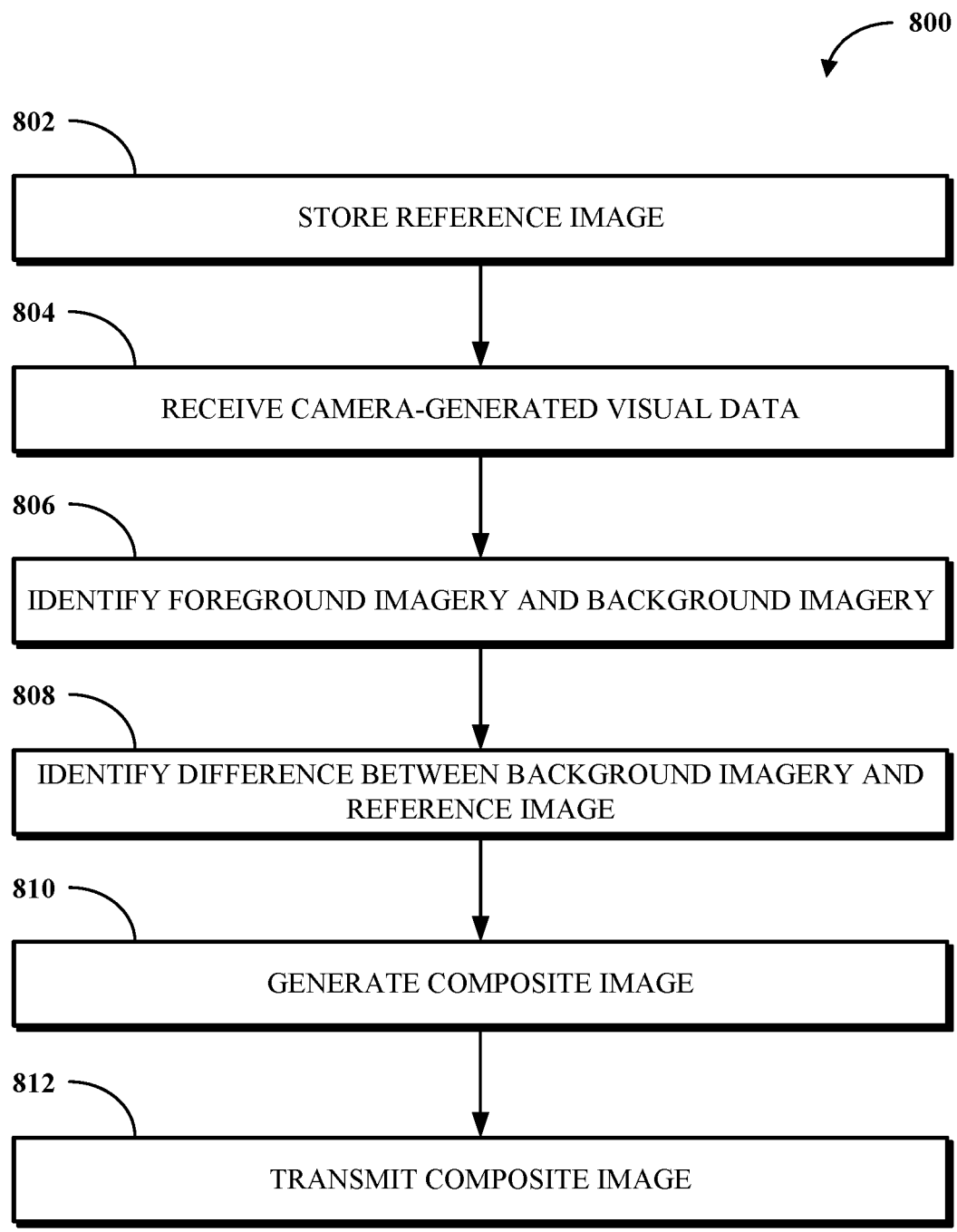
FIG. 8 is a flowchart of an example of a technique for background cleanup using a reference image.
Figure 9:
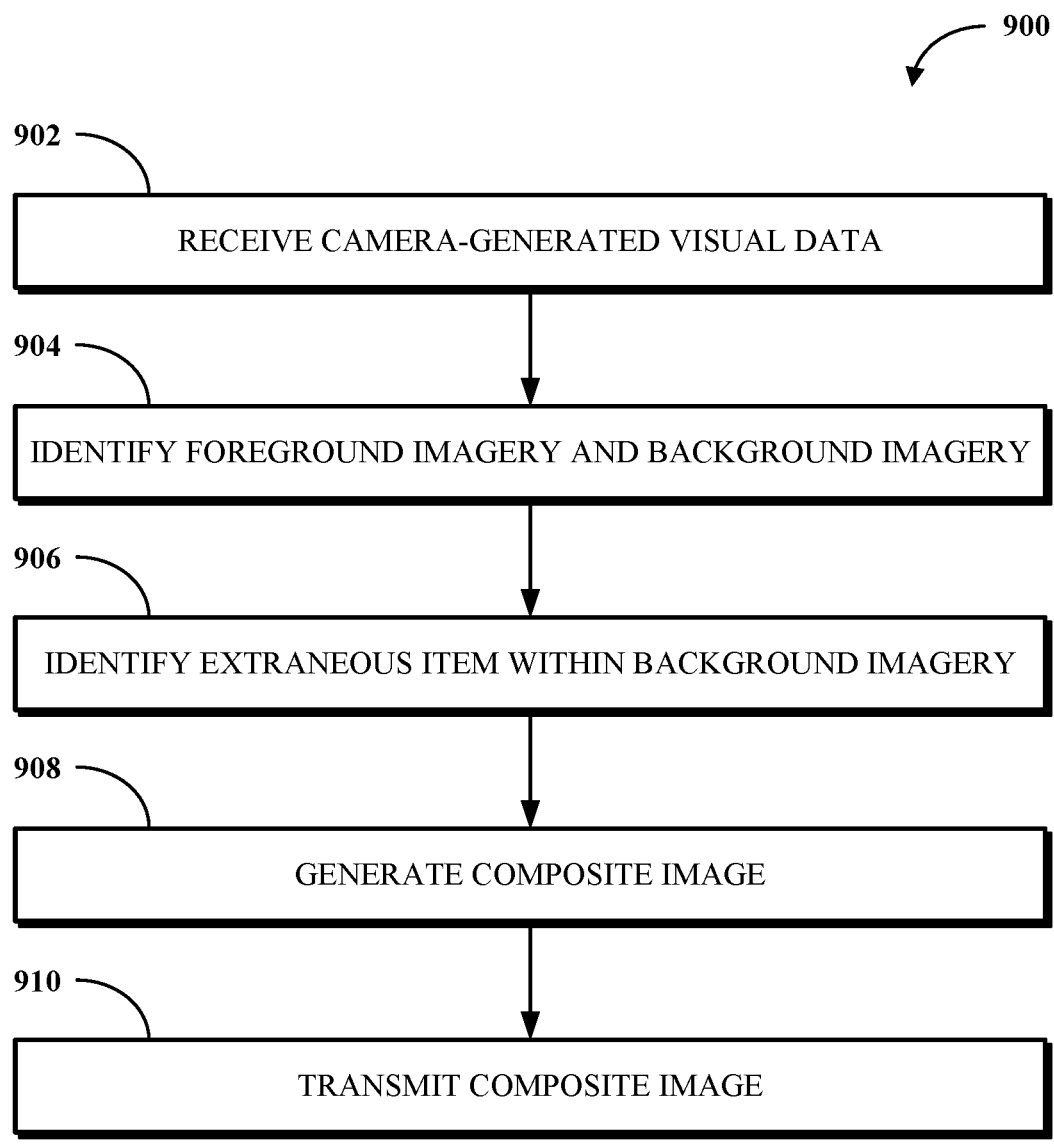
FIG. 9 is a flowchart of an example of a technique for background cleanup using replacement imagery prediction.

To further describe some implementations in greater detail, reference is next made to examples of techniques for background cleanup. FIG. 8 is a flowchart of an example of a technique 800 for background cleanup using a reference image. FIG. 9 is a flowchart of an example of a technique 900 for background cleanup using replacement imagery prediction. The techniques 800, 900 can be executed using computing devices, such as the systems, hardware, and software described with respect to FIGS. 1-7. The techniques 800, 900 can be performed, for example, by executing a machine-readable program or other computer-executable instructions, such as routines, instructions, programs, or other code. The steps, or operations, of the techniques 800, 900 or another technique, method, process, or algorithm described in connection with the implementations disclosed herein can be implemented directly in hardware, firmware, software executed by hardware, circuitry, or a combination thereof.

For simplicity of explanation, each of the techniques 800, 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

As described above, FIG. 8 illustrates the technique 800 for background cleanup using a reference image.

At 802, a computing device (e.g., the client device 402 or the server 404) stores a reference image representing a physical background within a field of view of a camera of a client device (e.g., the client device 402). Alternatively, the computing device may access the image from remote storage (e.g., at a server or a data repository, and stored in association with a user account of a user accessing video conferencing software at the computing device). The reference image may be generated by a user of the client device 402 or another user of another device at a time when a room (or other location) where video conferences are to be conducted is in an approved (e.g., by the user or by another person, such as an administrator, who generates the reference image) state, for example, free from dirt and clutter. The reference image may be generated by panning or rotating a camera around a room, so as to allow the reference image to be used if the camera is repositioned during the video conference. In some cases, a user may be able to edit the reference image, for example, by removing items (e.g., a garbage can or a moving box) that are not to be presented in the video conference and/or by adding virtual stickers. The user may provide replacement imagery for the removed items. Alternatively, artificial intelligence techniques and/or rule-based techniques may be used to predict the replacement imagery.

At 804, the computing device receives, via a camera and during a conference to which the client device is connected, camera-generated visual data for output to at least one remote device connected to the video conference. The camera-generated visual data includes imagery of at least one person and their surroundings generated by the camera. The camera-generated visual data may include at least one frame in a video stream generated by the camera.

At 806, the computing device identifies, based on facial recognition applied to the camera-generated visual data, foreground imagery representing a person (or multiple people) and background imagery representing content of the camera-generated visual data other than the foreground imagery. Each pixel of the camera-generated visual data may be assigned to either the foreground imagery or the background imagery. However, the positions of the foreground imagery and the background imagery may change between frames, for example, if the person moves.

At 808, the computing device identifies a difference between the background imagery and the reference image. For example, the computing device may identify items in the background imagery, using item identification software trained based on labeled pictures of items, and verify whether those items are also present in co-located parts of the reference image. Co-located parts of the reference image may be identified based on non-movable fixtures (e.g., walls) in the reference image and the background imagery.

At 810, the computing machine generates a composite image by replacing, within the background imagery of the camera-generated visual data, an item represented within the background imagery and within the identified difference with the co-located part of the reference image. In some cases, when the person depicted in the foreground imagery moves in front of the item, the composite image depicts the person obscuring the co-located part of the reference image.

In some implementations, to generate the composite image, the computing machine adds a virtual sticker (e.g., the virtual sticker 704C, 704D) to overlay a part of the background imagery. The computing machine detects, via the camera, that the person has moved in front of a first part of the virtual sticker. In response, the composite image includes the person obscuring the part of the virtual sticker, and a second part of the virtual sticker that is not obscured by the person. It should be noted that, while modifications to the background imagery (e.g., removing items or adding virtual stickers) may be done, a part of the background imagery remains unchanged so that participants in the conference can see the general area where the user of the client device is located.

At 812, the computing machine transmits the composite image to the remote devices (e.g., the remote devices 406A, 406B) connected to the video conference for display thereat. If the computing machine is the server, the computing machine may transmit the composite image to the remote devices connected to the video conference. In some examples, the computing machine is the client device. The client device may transmit the composite image to the server for further transmission from the server to the remote devices.

The technique 800, including 802-812, is described as being implemented at a computing machine, which may be, for example, the client device or the server. In some cases, all of the blocks are implemented at the client device. In some cases, all of the blocks 802-812 are implemented at the server. In some cases, processing is split between the client device and the server based on instantaneous capabilities of the client device or the server. For example, the client device may have high processing capabilities. However, if in the middle of a video conference, the processing capabilities are reduced (e.g., due to a software update pushed to the client device by a developer of the operating system of the client device), processing of the technique 800, including 802-812, may be handed over from the client device to the server.

In one example use case, a user named Mary arrives at a new office with her client device and generates a reference image for the office. Mary's office has a garbage can, so Mary selects a menu item for editing the reference image to remove the garbage can. Upon being prompted to select a replacement image for the garbage can. Mary indicates that the carpet surrounding the garbage can should be extended into the area of the garbage can. The next day, movers arrive with Mary's moving boxes and place the moving boxes on the floor. After the movers leave but before she unpacks, Mary attends a video conference. During the video conference, Mary shares her real background with background cleanup. The background cleanup software replaces the garbage can and the moving boxes with the co-located parts of the reference image. As a result, other participants in the conference are able to see Mary's new office without the garbage can and the moving boxes, which would make the office appear less appealing if left in the image.

As described above, FIG. 9 illustrates the technique 900 for background cleanup using replacement imagery prediction.

At 902, a computing device (e.g., the client device 402 or the server 404) camera-generated visual data. The camera-generated visual data may be received from a camera of a client device (which may or may not be the computing device) and during a video conference to which the client device is connected. The camera-generated visual data may be generated for transmission to a remote device connected to the video conference. The camera-generated visual data may include a frame (or multiple frames) in a video stream generated by the camera for sharing via the video conference.

At 904, the computing device identifies foreground imagery representing at least one person and background imagery representing content of the camera-generated visual data other than the foreground imagery. The foreground imagery may be identified based on facial recognition technology applied to the camera-generated visual data.

At 906, the computing device identifies an extraneous item within the background imagery. The extraneous item is represented within a portion of the background imagery (e.g., as illustrated in FIG. 7A, the garbage can 704A is an extraneous item that is represented within a portion of the background imagery, but not all of the background imagery, of the image 700A). The extraneous item is identified for removal from the background imagery. The extraneous item may be identified manually (e.g., based on a user input) or automatically, as described above.

At 908, the computing machine generates a composite image by removing the extraneous item from the camera-generated visual data. The computing machine predicts, using replacement imagery prediction software, replacement imagery to replace the removed extraneous item. The composite image may include the foreground imagery and the background imagery with the replacement imagery replacing the extraneous item. In some cases, the person depicted in the foreground imagery may move in front of the removed extraneous item. As a result, the composite image may depict the person obscuring all or part of the replacement imagery that replaced the extraneous item. In some implementations, a virtual sticker is added to the background imagery, as described above in conjunction with FIGS. 7C-D and FIG. 8.

At 910, the computing machine transmits the composite image to the remote device connected to the video conference. The transmission may be performed similarly to the transmission of 812 described above in conjunction with FIG. 8.

As described above, the technique 900 may be performed fully at the client device, fully at the server, or partially at the client device and partially at the server depending on the capabilities of the client device and the capabilities of the server. The capabilities of the client device or the server may change during implementation of the technique. For example, the client device or the server may run out of memory or there may be contention for processing resources of the client device or the server based on other processes running on the client device or the server in parallel with the technique 900.

In one example use case, a user named Jack is attending a video conference from a hotel room. The hotel room bed and a dirty towel are on the floor behind Jack. When the video conference begins, Jack provides an input, via a menu of the video conferencing software, to cleanup his background. Jack draws a circle around the bed, to indicate that the bed should be removed. In response, the bed is removed and Jack's computer uses artificial intelligence techniques to predict a replacement image (e.g., including a wall and a floor pattern) to replace the bed.

After the bed is replaced, an operating system software update begins running on Jack's computer and processing of the background cleanup moves to the server. The server identifies objects in Jack's background and detects the dirty towel on the floor. Based on other users removing dirty towels on the floor from their background, the server automatically removes the dirty towel from the floor and predicts a replacement image (including the floor pattern) to replace the towel.

Later during the video conference, Jack moves in front of the bed. In response, in the images transmitted to other computers connected to the video conference, Jack is shown as being in front of the replacement imagery replacing the bed. After the conference, Jack is notified (e.g., via a push notification from the video conferencing software on Jack's mobile phone) that the dirty towel was automatically removed from the background imagery. Jack is asked to indicate (e.g., by pressing a button) whether he approves of this removal. Jack's response is used to train extraneous item identification software (e.g., the extraneous item identification software 604) that runs at the server and/or at client devices.

Some implementations are described below as numbered examples (Example 1, 2, 3, etc.). These examples are provided as examples only and do not limit the other implementations disclosed herein.

Example 1 is a method, comprising: storing a reference image representing a physical background within a field of view of a camera of a client device; receiving, via the camera and during a video conference to which the client device is connected, camera-generated visual data for output to at least one remote device connected to the video conference; identifying, based on facial recognition applied to the camera-generated visual data, foreground imagery representing at least one person and background imagery representing content of the camera-generated visual data other than the foreground imagery; identifying a difference between the background imagery and the reference image; generating a composite image by replacing, within the background imagery of the camera-generated visual data, an item represented within the background imagery and within the identified difference with a co-located part of the reference image; and transmitting the composite image to the at least one remote device during the video conference.

In Example 2, the subject matter of Example 1 includes, wherein the camera-generated visual data comprises at least one frame in a video stream generated by the camera.

In Example 3, the subject matter of Examples 1-2 includes, wherein, when the at least one person moves in front of the item, the composite image depicts the at least one person obscuring the co-located part of the reference image.

In Example 4, the subject matter of Examples 1-3 includes, wherein generating the composite image comprises: adding a virtual sticker to overlay a part of the background imagery; and detecting, via the camera, that the at least one person has moved in front of a first part of the virtual sticker, wherein the composite image comprises the at least one person obscuring the part of the virtual sticker, wherein the composite image comprises a second part of the virtual sticker that is not obscured by the at least one person.

In Example 5, the subject matter of Examples 1~4 includes, wherein storing the reference image comprises: obtaining the reference image via the camera; receiving a user prompt to remove an extraneous item from the reference image, the user prompt comprising drawing a shape around the extraneous item; and modifying the reference image to replace the reference item with predicted visual data that would exist if the extraneous item were absent.

In Example 6, the subject matter of Examples 1-5 includes, wherein identifying the difference between the background imagery and the reference image comprises: identifying that the item represented within the background imagery is different from the co-located part of the reference image.

In Example 7, the subject matter of Examples 1-6 includes, wherein the composite image maintains at least a portion of the background imagery from the camera-generated visual data.

In Example 8, the subject matter of Examples 1-7 includes, storing multiple reference images, including the reference image representing the physical background; and identifying the reference image representing the physical background based on a geographic location of the client device.

In Example 9, the subject matter of Examples 1-8 includes, determining whether to generate the composite image at the client device or at a server based on capabilities of the client device, wherein the capabilities comprise at least one of processing capabilities, memory capabilities, network access capabilities, software capabilities, and hardware capabilities.

Example 10 is a non-transitory computer readable medium storing instructions operable to cause one or more processors to perform operations comprising: storing a reference image representing a physical background within a field of view of a camera of a client device; receiving, via the camera and during a video conference to which the client device is connected, camera-generated visual data for output to at least one remote device connected to the video conference; identifying, based on facial recognition applied to the camera-generated visual data, foreground imagery representing at least one person and background imagery representing content of the camera-generated visual data other than the foreground imagery; identifying a difference between the background imagery and the reference image; generating a composite image by replacing, within the background imagery of the camera-generated visual data, an item represented within the background imagery and within the identified difference with a co-located part of the reference image; and transmitting the composite image to the at least one remote device during the video conference.

In Example 11, the subject matter of Example 10 includes, wherein the camera-generated visual data comprises a frame in a video stream.

In Example 12, the subject matter of Examples 10-11 includes, wherein, when the at least one person moves in front of the item, the composite image depicts the at least one person in front of the co-located part of the reference image.

In Example 13, the subject matter of Examples 10-12 includes, wherein generating the composite image comprises: adding a sticker to overlay a part of the background imagery; and detecting, via the camera, that the at least one person has moved in front of a first part of the sticker, wherein the composite image comprises the at least one person standing in front of the part of the sticker, wherein the composite image comprises a second part of the sticker in front of which the at least one person is not standing.

In Example 14, the subject matter of Examples 10-13 includes, wherein storing the reference image comprises: receiving a user prompt to remove an extraneous item from the reference image, the user prompt comprising drawing a shape around the extraneous item; and modifying the reference image to replace the reference item with predicted visual data that would exist if the extraneous item were absent.

In Example 15, the subject matter of Examples 10-14 includes, wherein identifying the difference between the background imagery and the reference image comprises: identifying that the item represented within the background imagery is absent from the co-located part of the reference image.

In Example 16, the subject matter of Examples 10-15 includes, wherein the composite image maintains a portion of the background imagery.

In Example 17, the subject matter of Examples 10-16 includes, the operations comprising: storing multiple reference images, wherein the multiple reference images comprise the reference image representing the physical background; and identifying the reference image representing the physical background based on a geographic location associated with a global positioning system of the client device.

In Example 18, the subject matter of Examples 10-17 includes, the operations comprising: determining whether to generate the composite image at the client device or at a server based on capabilities of the client device.

Example 19 is an apparatus, comprising: a memory; and a processor configured to execute instructions stored in the memory to: store a reference image representing a physical background within a field of view of a camera of a client device; receive, via the camera and during a video conference to which the client device is connected, camera-generated visual data for output to at least one remote device connected to the video conference; identify, based on facial recognition applied to the camera-generated visual data, foreground imagery representing at least one person and background imagery representing content of the camera-generated visual data other than the foreground imagery; identify a difference between the background imagery and the reference image; generate a composite image by replacing, within the background imagery of the camera-generated visual data, an item represented within the background imagery and within the identified difference with a co-located part of the reference image; and transmit the composite image to the at least one remote device during the video conference.

In Example 20, the subject matter of Example 19 includes, the processor configured to execute the instructions stored in the memory to: determine whether to generate the composite image at the client device or at a server based on capabilities of the server.

Example 21 is a method, comprising: receiving, during a video conference to which a client device is connected, camera-generated visual data for output to at least one remote device participating in the video conference; identifying, based on facial recognition applied to the camera-generated visual data, foreground imagery representing at least one person and background imagery representing content of the camera-generated visual data other than the foreground imagery; identifying, within the background imagery, an extraneous item for removal, wherein the extraneous item comprises a portion of the background imagery; generating a composite image by removing the extraneous item from the camera-generated visual data and predicting, using replacement imagery prediction software, replacement imagery to replace the removed extraneous item; and transmitting the composite image to the at least one remote device during the video conference.

In Example 22, the subject matter of Example 21 includes, wherein the camera-generated visual data comprises at least one frame in a video generated by the camera.

In Example 23, the subject matter of Examples 21-22 includes, wherein, when the at least one person moves in front of the extraneous item, the composite image depicts the at least one person obscuring the co-located part of the replacement imagery.

In Example 24, the subject matter of Examples 21-23 includes, wherein generating the composite image comprises: adding a virtual sticker to overlay a part of the background imagery; and detecting, via a camera, that the at least one person has moved in front of a first part of the virtual sticker, wherein the composite image comprises the at least one person obscuring the part of the virtual sticker, wherein the composite image comprises a second part of the virtual sticker that is not obscured by the at least one person.

In Example 25, the subject matter of Examples 21-24 includes, wherein the composite image maintains at least a part of the background imagery from the camera-generated visual data, wherein the part of the background imagery is distinct from the replacement imagery.

In Example 26, the subject matter of Examples 21-25 includes, determining whether to generate the composite image at the client device or at a server based on capabilities of the client device, wherein the capabilities comprise at least one of processing capabilities, memory capabilities, network access capabilities, software capabilities, and hardware capabilities, wherein the hardware capabilities are related to item recognition technology.

In Example 27, the subject matter of Examples 21-26 includes, wherein the extraneous item is identified by receiving, via a graphical user interface, an input associated with drawing a border around the extraneous item.

In Example 28, the subject matter of Examples 21-27 includes, wherein the extraneous item is identified using extraneous item identification software, wherein the extraneous item identification software is trained based on previously identified extraneous items.

Example 29 is a non-transitory computer readable medium storing instructions operable to cause one or more processors to perform operations comprising: receiving, during a video conference to which a client device is connected, camera-generated visual data for output to at least one remote device participating in the video conference; identifying, based on facial recognition applied to the camera-generated visual data, foreground imagery representing at least one person and background imagery representing content of the camera-generated visual data other than the foreground imagery; identifying, within the background imagery, an extraneous item for removal, wherein the extraneous item comprises a portion of the background imagery; generating a composite image by removing the extraneous item from the camera-generated visual data and predicting, using replacement imagery prediction software, replacement imagery to replace the removed extraneous item; and transmitting the composite image to the at least one remote device during the video conference.

In Example 30, the subject matter of Example 29 includes, wherein the camera-generated visual data comprises a frame in a video.

In Example 31, the subject matter of Examples 29-30 includes, wherein, when the at least one person moves in front of the extraneous item, the composite image depicts the at least one person in front of the co-located part of the replacement imagery.

In Example 32, the subject matter of Examples 29-31 includes, wherein generating the composite image comprises: adding one or more virtual stickers to overlay a part of the background imagery; and detecting, via a camera, that the at least one person has moved in front of a first part of the one or more virtual stickers, wherein the composite image comprises the at least one person obscuring the part of the one or more virtual stickers, wherein the composite image comprises a second part of the one or more virtual stickers that is not obscured by the at least one person.

In Example 33, the subject matter of Examples 29-32 includes, wherein the composite image maintains at least a part of the background imagery, wherein the part of the background imagery is distinct from the replacement imagery.

In Example 34, the subject matter of Examples 29-33 includes, the operations comprising: determining whether to generate the composite image at the client device or at a server based on capabilities of the client device and capabilities of the server, wherein the capabilities of the client device or the capabilities of the server comprise hardware capabilities related to item recognition technology.

In Example 35, the subject matter of Examples 29-34 includes, wherein the extraneous item is identified by receiving, via a graphical user interface, a representation of a drawn border around the extraneous item.

In Example 36, the subject matter of Examples 29-35 includes, wherein the extraneous item is identified automatically using extraneous item identification software.

Example 37 is an apparatus, comprising: a memory; and a processor configured to execute instructions stored in the memory to: receive, during a video conference to which a client device is connected, camera-generated visual data for output to at least one remote device participating in the video conference; identify, based on facial recognition applied to the camera-generated visual data, foreground imagery representing at least one person and background imagery representing content of the camera-generated visual data other than the foreground imagery; identify, within the background imagery, an extraneous item for removal, wherein the extraneous item comprises a portion of the background imagery; generate a composite image by removing the extraneous item from the camera-generated visual data and predicting, using replacement imagery prediction software, replacement imagery to replace the removed extraneous item; and transmit the composite image to the at least one remote device during the video conference.

In Example 38, the subject matter of Example 37 includes, wherein the camera-generated visual data comprises a video frame.

In Example 39, the subject matter of Examples 37-38 includes, wherein, when the at least one person moves in front of the extraneous item, the composite image depicts the at least one person in front of the co-located part of the replacement imagery and forgoes depicting the extraneous item.

In Example 40, the subject matter of Examples 37-39 includes, wherein generating the composite image comprises: adding a sticker to overlay a part of the background imagery; and detecting, via a camera, that the at least one person has moved in front of a first part of the sticker, wherein the composite image comprises the at least one person obscuring the part of the sticker.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

storing a reference image representing a physical background within a field of view of a camera of a client device;

receiving, via the camera and during a video conference to which the client device is connected, camera-generated visual data for output to at least one remote device connected to the video conference;

identifying, based on facial recognition applied to the camera-generated visual data, foreground imagery representing at least one person and background imagery representing content of the camera-generated visual data other than the foreground imagery;

identifying a difference between the background imagery and the reference image by identifying an item in the background imagery and determining that the item is not present at a co-located part of the reference image, the co-located part of the reference image being identified based on non-movable fixtures depicted in the background imagery and the reference image;

generating a composite image by replacing, within the background imagery of the camera-generated visual data, an item represented within the background imagery and within the identified difference with a co-located part of the reference image; and transmitting the composite image to the at least one remote device during the video conference.

2. The method of claim 1, wherein the camera-generated visual data comprises at least one frame in a video stream generated by the camera.

3. The method of claim 1, wherein, when the at least one person moves in front of the item, the composite image depicts the at least one person obscuring the co-located part of the reference image.

4. The method of claim 1, wherein generating the composite image comprises:

adding a virtual sticker to overlay a part of the background imagery; and detecting, via the camera, that the at least one person has moved in front of a first part of the virtual sticker, wherein the composite image comprises the at least one person obscuring the part of the virtual sticker, wherein the composite image comprises a second part of the virtual sticker that is not obscured by the at least one person.

5. The method of claim 1, wherein storing the reference image comprises:

obtaining the reference image via the camera;

receiving a user prompt to remove an extraneous item from the reference image, the user prompt comprising drawing a shape around the extraneous item; and modifying the reference image to replace the reference item with predicted visual data that would exist if the extraneous item were absent.

6. The method of claim 1, wherein identifying the difference between the background imagery and the reference image comprises:

identifying that the item represented within the background imagery is different from the co-located part of the reference image.

7. The method of claim 1, wherein the composite image maintains at least a portion of the background imagery from the camera-generated visual data.

8. The method of claim 1, comprising:
storing multiple reference images, including the reference image representing the physical background; and
identifying the reference image representing the physical background based on a geographic location of the client device.

9. The method of claim 1, comprising:
determining whether to generate the composite image at the client device or at a server based on capabilities of the client device, wherein the capabilities comprise at least one of processing capabilities, memory capabilities, network access capabilities, software capabilities, and hardware capabilities.

10. A non-transitory computer readable medium storing instructions operable to cause one or more processors to perform operations comprising:
storing a reference image representing a physical background within a field of view of a camera of a client device;
receiving, via the camera and during a video conference to which the client device is connected, camera-generated visual data for output to at least one remote device connected to the video conference;
identifying, based on facial recognition applied to the camera-generated visual data, foreground imagery representing at least one person and background imagery representing content of the camera-generated visual data other than the foreground imagery;
identifying a difference between the background imagery and the reference image by identifying an item in the background imagery and determining that the item is not present at a co-located part of the reference image, the co-located part of the reference image being identified based on non-movable fixtures depicted in the background imagery and the reference image;
generating a composite image by replacing, within the background imagery of the camera-generated visual data, an item represented within the background imagery and within the identified difference with a co-located part of the reference image; and
transmitting the composite image to the at least one remote device during the video conference.

11. The computer readable medium of claim 10, wherein the camera-generated visual data comprises a frame in a video stream.

12. The computer readable medium of claim 10, wherein, when the at least one person moves in front of the item, the composite image depicts the at least one person in front of the co-located part of the reference image.

13. The computer readable medium of claim 10, wherein generating the composite image comprises:
adding a sticker to overlay a part of the background imagery; and
detecting, via the camera, that the at least one person has moved in front of a first part of the sticker, wherein the composite image comprises the at least one person standing in front of the part of the sticker, wherein the composite image comprises a second part of the sticker in front of which the at least one person is not standing.

14. The computer readable medium of claim 10, wherein storing the reference image comprises:

receiving a user prompt to remove an extraneous item from the reference image, the user prompt comprising drawing a shape around the extraneous item; and
modifying the reference image to replace the reference item with predicted visual data that would exist if the extraneous item were absent.

15. The computer readable medium of claim 10, wherein identifying the difference between the background imagery and the reference image comprises:
identifying that the item represented within the background imagery is absent from the co-located part of the reference image.

16. The computer readable medium of claim 10, wherein the composite image maintains a portion of the background imagery.

17. The computer readable medium of claim 10, the operations comprising:
storing multiple reference images, wherein the multiple reference images comprise the reference image representing the physical background; and
identifying the reference image representing the physical background based on a geographic location associated with a global positioning system of the client device.

18. The computer readable medium of claim 10, the operations comprising:
determining whether to generate the composite image at the client device or at a server based on capabilities of the client device.

19. An apparatus, comprising:
a memory; and
a processor configured to execute instructions stored in the memory to:
store a reference image representing a physical background within a field of view of a camera of a client device;
receive, via the camera and during a video conference to which the client device is connected, camera-generated visual data for output to at least one remote device connected to the video conference;
identify, based on facial recognition applied to the camera-generated visual data, foreground imagery representing at least one person and background imagery representing content of the camera-generated visual data other than the foreground imagery;
identify a difference between the background imagery and the reference image by identifying an item in the background imagery and determining that the item is not present at a co-located part of the reference image, the co-located part of the reference image being identified based on non-movable fixtures depicted in the background imagery and the reference image;
generate a composite image by replacing, within the background imagery of the camera-generated visual data, an item represented within the background imagery and within the identified difference with a co-located part of the reference image; and
transmit the composite image to the at least one remote device during the video conference.

20. The apparatus of claim 19, the processor configured to execute the instructions stored in the memory to:
determine whether to generate the composite image at the client device or at a server based on capabilities of the server.

* * * * *